US012737185B2

(12) United States Patent
Craske et al.

(10) Patent No.: US 12,737,185 B2
(45) Date of Patent: Sep. 15, 2026

(54) TECHNIQUE FOR HANDLING ORDERING CONSTRAINED ACCESS OPERATIONS

(71) Applicant: Arm Limited, Cambridge (GB)

(72) Inventors: Simon John Craske, Cambridge (GB); Jacob Eapen, Northstowe (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/853,552

(22) PCT Filed: Mar. 13, 2023

(86) PCT No.: PCT/GB2023/050589
§ 371 (c)(1),
(2) Date: Oct. 2, 2024

(87) PCT Pub. No.: WO2023/194702
PCT Pub. Date: Oct. 12, 2023

(65) Prior Publication Data

US 2025/0190217 A1 Jun. 12, 2025

(30) Foreign Application Priority Data

Apr. 7, 2022 (GB) ...................................... 2205110

(51) Int. Cl.
*G06F 9/30* (2018.01)

(52) U.S. Cl.
CPC ........ *G06F 9/3013* (2013.01); *G06F 9/30043* (2013.01); *G06F 9/3016* (2013.01)

(58) Field of Classification Search
CPC ..................................................... G06F 9/3013
See application file for complete search history.

(56) References Cited

U.S. PATENT DOCUMENTS 5,201,039 A 4/1993 Sakamura
5,887,183 A 3/1999 Agarwal et al.
(Continued)

OTHER PUBLICATIONS

Office Action for EP Application No. 23711543.1 dated Jul. 8, 2025, 6 pages.

(Continued)

*Primary Examiner* — Michael J Metzger
(74) *Attorney, Agent, or Firm* — NIXON & VANDERHYE P.C.

(57) ABSTRACT

Processing circuitry is provided to perform operations, along with instruction decoder circuitry to decode instructions to control the processing circuitry to perform the operations specified by the instructions. A set of registers is used to hold data values for access by the processing circuitry. The instruction decoder circuitry is responsive to an ordering constrained access instruction used to access multiple data values, and providing register indication information and memory address information, to control the processing circuitry to perform a sequence of access operations, where each access operation causes a data value from amongst the multiple data values to be moved between an associated register determined from the register indication information and an associated memory address determined from the memory address information. Further, an ordering indication is derived from the ordering constrained access instruction and used to determine an order in which the multiple data values are to be accessed when performing the sequence of access operations, to thereby ensure that observability conditions required when implementing the ordering constrained access instruction are met.

16 Claims, 7 Drawing Sheets

(56) References Cited

U.S. PATENT DOCUMENTS

| | | | |
|---|---|---|---|
| 10,503,512 | B2 * | 12/2019 | Craske ................ G06F 12/1433 |
| 2003/0131205 | A1 | 7/2003 | Huck |
| 2018/0095756 | A1 | 4/2018 | Hasenplaugh et al. |
| 2019/0065199 | A1 * | 2/2019 | Robinson .............. G06F 9/3861 |

OTHER PUBLICATIONS

International Search report and the written opinion for International Application No. PCT/GB2023/050589, dated Jun. 15, 2023.
Combined Search and Examination Report for GB2205110.6, dated Dec. 2, 2022.
Office Action for IN Application No. 202417074877 dated Oct. 29, 2025, 7 pages.

* cited by examiner

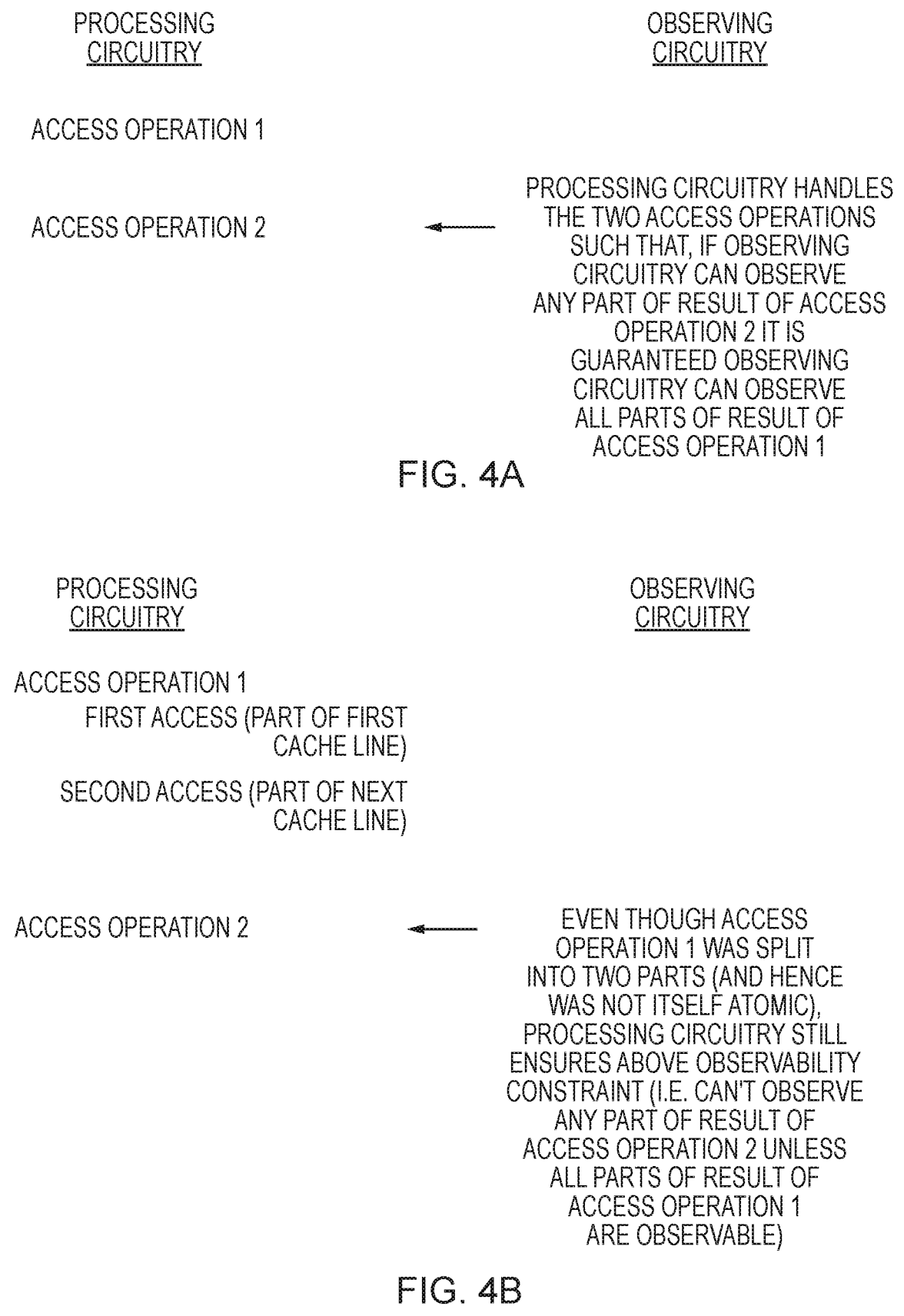

PROCESSING CIRCUITRY

OBSERVING CIRCUITRY

ACCESS OPERATION 1

ACCESS OPERATION 2

PROCESSING CIRCUITRY HANDLES THE TWO ACCESS OPERATIONS SUCH THAT, IF OBSERVING CIRCUITRY CAN OBSERVE ANY PART OF RESULT OF ACCESS OPERATION 2 IT IS GUARANTEED OBSERVING CIRCUITRY CAN OBSERVE ALL PARTS OF RESULT OF ACCESS OPERATION 1

FIG. 4A

PROCESSING CIRCUITRY

OBSERVING CIRCUITRY

ACCESS OPERATION 1

FIRST ACCESS (PART OF FIRST CACHE LINE)

SECOND ACCESS (PART OF NEXT CACHE LINE)

ACCESS OPERATION 2

EVEN THOUGH ACCESS OPERATION 1 WAS SPLIT INTO TWO PARTS (AND HENCE WAS NOT ITSELF ATOMIC), PROCESSING CIRCUITRY STILL ENSURES ABOVE OBSERVABILITY CONSTRAINT (I.E. CAN'T OBSERVE ANY PART OF RESULT OF ACCESS OPERATION 2 UNLESS ALL PARTS OF RESULT OF ACCESS OPERATION 1 ARE OBSERVABLE)

FIG. 4B

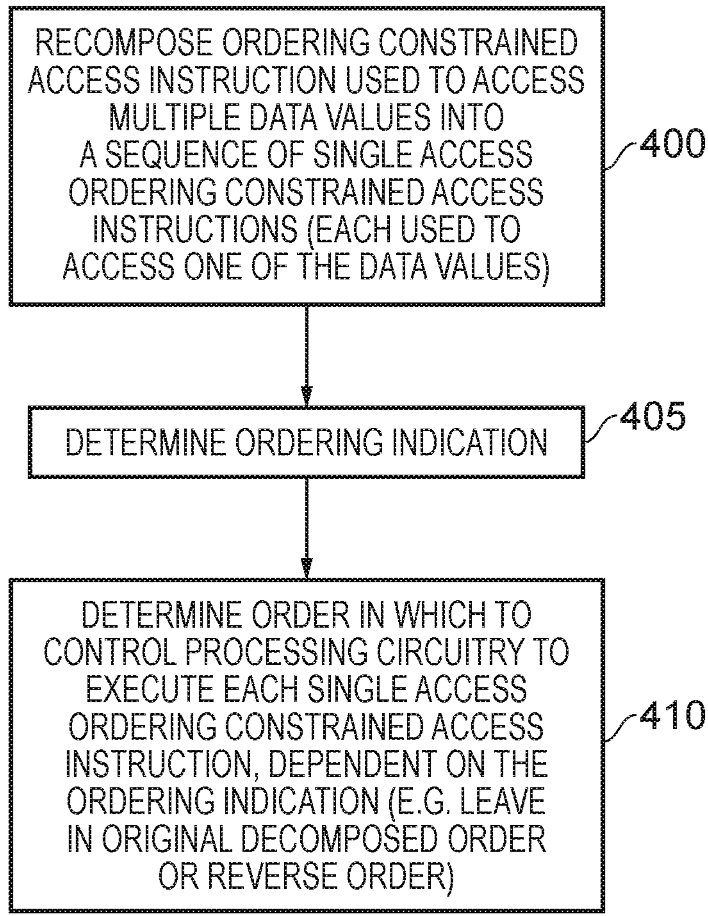
FIG. 6

TECHNIQUE FOR HANDLING ORDERING CONSTRAINED ACCESS OPERATIONS

BACKGROUND

The present technique relates to the handling of ordering constrained access operations.

Within modern data processing systems, there are various types of consistency models that may be employed when performing accesses to memory. One common approach is to adopt a relatively weak consistency model, where a series of accesses to memory performed by a given processing element in the system may not necessarily be observed as occurring in the same order by other processing elements in the system observing those accesses (i.e. one observing processing element may observe a different order to another observing processing element). Such an approach can provide a great deal of flexibility in how various accesses are reordered by individual processing elements, with the aim of increasing performance.

However, in some situations it may be necessary to adopt a stricter consistency model that ensures that each observing processing element observes another processing element's accesses as having occurred in the same order. Two examples of such stricter consistency models may be referred to as total store order (TSO) and release consistency, processor consistent (RCpc).

It is possible to emulate the requirements of such stricter consistency models in a system that supports a weaker consistency model, through the use of single access ordering constrained access instructions such as load acquire and store release instructions. When such a load acquire or store release instruction is executed by a given processing element, the processing element is constrained when performing the required load or store operation to ensure that the observability requirement for the ordering of access operations dictated by the stricter consistency model is met.

However, it is often desirable within data processing systems to improve code density so as to seek to increase performance, and this can be problematic when using such ordering constrained access instructions.

SUMMARY

In one example arrangement, there is provided an apparatus comprising: processing circuitry to perform operations; instruction decoder circuitry to decode instructions to control the processing circuitry to perform the operations specified by the instructions; and a set of registers to hold data values for access by the processing circuitry; wherein the instruction decoder circuitry is responsive to an ordering constrained access instruction used to access multiple data values, and providing register indication information and memory address information, to control the processing circuitry to perform a sequence of access operations, where each access operation causes a data value from amongst the multiple data values to be moved between an associated register determined from the register indication information and an associated memory address determined from the memory address information; and wherein an ordering indication is derived from the ordering constrained access instruction and used to determine an order in which the multiple data values are to be accessed when performing the sequence of access operations.

In another example arrangement, there is provided a method of handling ordering constrained access operations in an apparatus having processing circuitry to perform operations, the method comprising: employing instruction decoder circuitry to decode instructions to control the processing circuitry to perform the operations specified by the instructions; employing a set of registers to hold data values for access by the processing circuitry; causing the instruction decoder circuitry, in response to an ordering constrained access instruction used to access multiple data values, and providing register indication information and memory address information, to control the processing circuitry to perform a sequence of access operations, where each access operation causes a data value from amongst the multiple data values to be moved between an associated register determined from the register indication information and an associated memory address determined from the memory address information; and determining, responsive to an ordering indication derived from the ordering constrained access instruction, an order in which the multiple data values are to be accessed when performing the sequence of access operations.

In a still further example arrangement, there is provided a computer program for controlling a host data processing apparatus to provide an instruction execution environment, comprising: processing program logic to perform operations; instruction decode program logic to decode instructions to control the processing program logic to perform the operations specified by the instructions; and register emulating program logic to emulate a set of registers to hold data values for access by the processing program logic; wherein the instruction decode program logic is responsive to an ordering constrained access instruction used to access multiple data values, and providing register indication information and memory address information, to control the processing program logic to perform a sequence of access operations, where each access operation causes a data value from amongst the multiple data values to be moved between an associated register determined from the register indication information and an associated memory address determined from the memory address information; and wherein an ordering indication is derived from the ordering constrained access instruction and used to determine an order in which the multiple data values are to be accessed when performing the sequence of access operations.

BRIEF DESCRIPTION OF THE DRAWINGS

The present technique will be described further, by way of illustration only, with reference to examples thereof as illustrated in the accompanying drawings, in which:

FIGS. 4A and 4B are diagrams schematically illustrating how observability requirements are met when processing an ordering constrained access instruction used to access multiple data values, in accordance with one example implementation;

FIG. 6 is a flow diagram illustrating one example implementation where decoder circuitry decomposes an ordering constrained access instruction used to access multiple data values into a sequence of single access ordering constrained access instructions.

DESCRIPTION OF EXAMPLES

Figure 1:
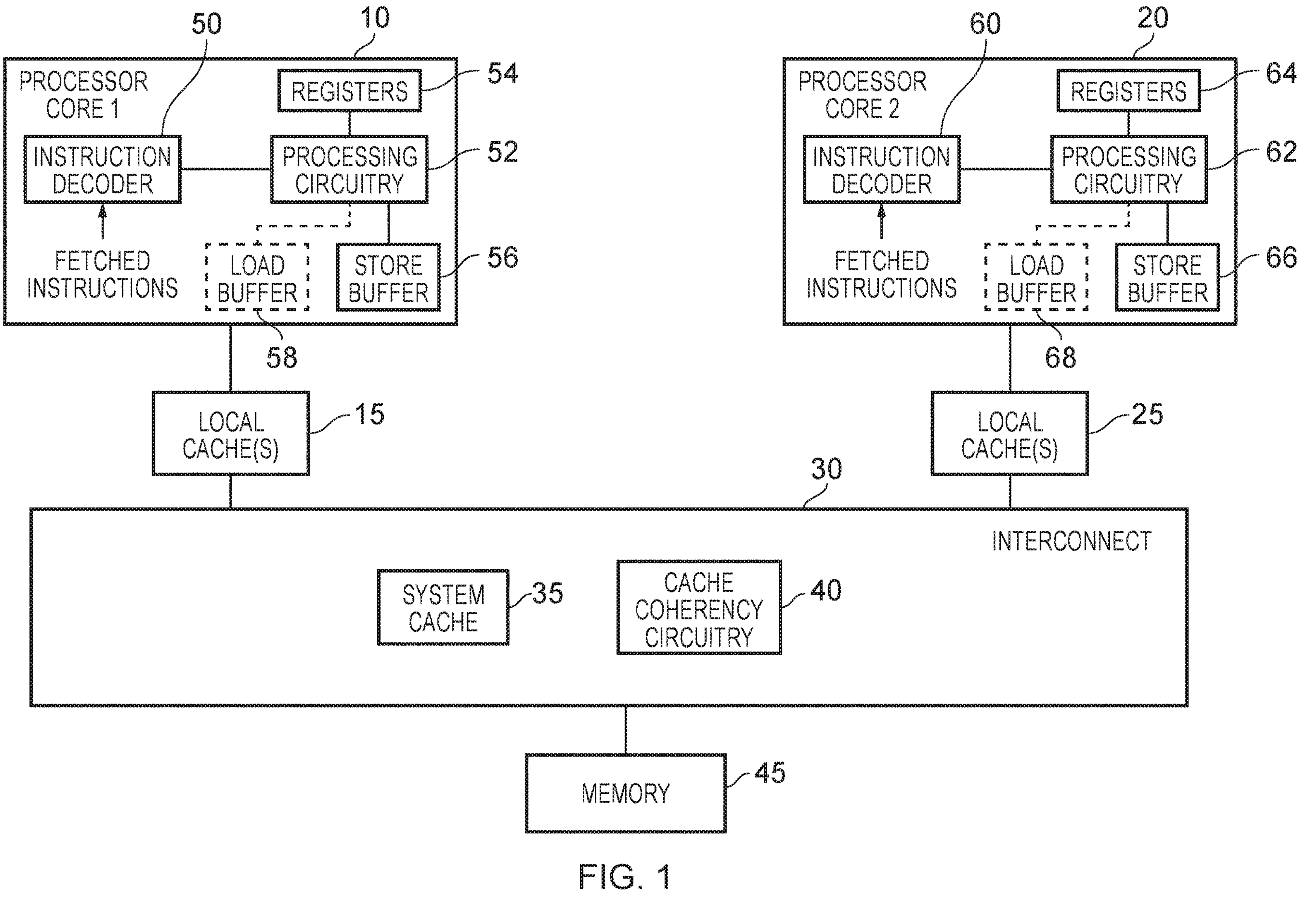
FIG. 1 is a block diagram of a system incorporating an apparatus in accordance with one example implementation.

In one example implementation, an apparatus is provided that has processing circuitry for performing operations, and instruction decoder circuitry to decode instructions in order to control the processing circuitry to perform the operations specified by those instructions. A set of registers is provided, where each register can be used to hold a data value for access by the processing circuitry. It should be noted that the data value may comprise one or more data elements, and the term "data value" used herein is used to refer to the block of data that can be held within a single register.

As mentioned earlier, when seeking to adopt certain consistency models, it is known to provide single access ordering constrained access instructions such as a load acquire instruction or a store release instruction. When such a single access ordering constrained access instruction is executed, a single register will be accessed (either as the source for a store operation or as the destination for a load operation). Further, the processing circuitry will ensure that an ordering constraint is met in order to meet certain observability requirements. For example, for a load acquire instruction, the processing circuitry will ensure that any access instruction (either load or store) appearing in a program order after the load acquire instruction will only be observed (for example by any other processing element in the system) as being executed after execution of the load acquire instruction has been completed. Expressed another way, the load operation associated with the load acquire instruction will be ordered before any access operation associated with another access instruction appearing in program order after the load acquire instruction.

Similarly, for a store release instruction, the processing circuitry will ensure that any access instruction that is observed as having completed execution before the store release instruction is observed as being executed will be an access instruction appearing in a program order prior to the store release instruction. Expressed another way, any access instruction appearing in a program order prior to the store release instruction will have its associated access operation ordered before the store operation associated with the store release instruction.

When seeking to improve code density, it is often desirable to replace two or more instructions with a single instruction where possible, as this can often enable significant performance improvements. However, this is problematic when considering the above single access ordering constrained access instructions, due to the observability requirements that need to be met when performing the associated access operations.

However, in accordance with the techniques described herein, this issue has been addressed via the provision of a new instruction that can be handled so as to take into account such observability requirements. In particular, an ordering constrained access instruction that is used to access multiple data values is provided, and the instruction decoder circuitry is responsive to such an instruction to control the processing circuitry to perform a sequence of access operations. Each access operation causes a data value from amongst the multiple data values to be moved between an associated register (determined from register indication information provided by the instruction) and an associated memory address (determined from memory address information provided by the instruction). In addition, an ordering indication is derived from the ordering constrained access instruction and is used to determine an order in which the multiple data values are to be accessed when performing the sequence of access operations. By the use of such an ordering indication, it is possible to ensure that the individual accesses are externally observable in the required order, and in particular can meet the same observability requirements that would be met had multiple single access ordering constrained access instructions been executed instead of the new ordering constrained access instruction used to access multiple data values.

In particular, it will be appreciated that if a series of single access ordering constrained access instructions were provided, each identifying a single data value and used to move that data value between an associated register and its address in memory, then any observing entity in the system will observe the accesses performed by those series of instructions in a particular order, namely the order in which those single access ordering constrained access instructions appear in program order. However, when seeking to replace such a series of single access ordering constrained access instructions with one instruction, it is important that the original order of observability of the accesses is maintained. This is achieved through the provision of the above-mentioned ordering information that is derived from the ordering constrained access instruction, thereby ensuring that the required observability constraints continue to be met.

The ordering indication may in one example implementation be determined by the instruction decoder circuitry when decoding the ordering constrained access instruction. However, in an alternative implementation the ordering indication may be determined by the processing circuitry based on the information provided to it by the instruction decoder circuitry.

The ordering indication can take a variety of forms. In one example implementation, the ordering indication is used to identify an order in which the memory addresses associated with the multiple data values are to be accessed, thereby determining the order in which the multiple data values are to be accessed. By way of example, the ordering indication may identify whether the lowest memory address should be accessed first, or the highest memory address should be accessed first. By the provision of such an ordering indication, this can provide significant flexibility, since it can allow the above-mentioned ordering constrained access instruction for accessing multiple data values to be used instead of a series of single access ordering constrained access instructions, irrespective of whether that series would have caused the lowest memory address to be accessed first or the highest memory address to be accessed first, since both options can be accommodated by the instruction.

In one example implementation, the instruction decoder circuitry is arranged to control the processing circuitry to ensure that, for observing circuitry coupled to the apparatus and able to observe the access operations performed by the processing circuitry, a given access operation in the sequence of access operations performed when executing the ordering constrained access instruction is observable by the observing circuitry as having completed before performance of any subsequent access operation following the given access operation in the sequence of access operations is observable by the observing circuitry. Hence, by way of example, if the sequence of access operations includes access operation A followed by access operation B, then if an observer can observe any part of access operation B the above requirement will ensure that it is also able to observe the entirety of access operation A. It is worth noting that this also implies the reverse observing condition, namely that if the observer cannot observe the entirety of access operation A, then it will not be able to observe any part of the access operation B.

In one example implementation, each data value may comprise a plurality of data elements. In such a scenario, if performance of the given access operation requires multiple accesses to be performed to access the plurality of data elements of the associated data value, the processing circuitry may be arranged to ensure that all of the multiple accesses forming the given access operation are observable by the observing circuitry as having completed before performance of any subsequent access operation following the given access operation in the sequence of access operations is observable by the observing circuitry. Hence, even in situations where performance of the given access operation needs to be implemented by multiple accesses, and hence the given access operation is not itself an atomic operation, the above requirement of ensuring that any subsequent access operation is not observable until the given access operation has completed can still be enforced. There are a variety of reasons why the given access operation may need to be performed by multiple accesses, but one specific example is where the data being accessed crosses a cache line boundary and hence separate accesses may be required to multiple cache lines.

In one example implementation, the ordering indication may be directly encoded within a field of the ordering constrained access instruction, and hence the ordering indication can be determined from an analysis of that field. However, in an alternative implementation there may be no need to provide a separate field for the ordering indication, and instead the ordering indication may be derived from other information encoded into the ordering constrained access instruction.

For instance, in one example implementation the ordering constrained access instruction is arranged to specify an addressing mode used to determine the memory addresses for the multiple data values from the memory address information, and the ordering indication may be derived in dependence on the addressing mode.

By way of example, the memory address information may be arranged to provide a memory address indication used to determine one memory address (this may for example be, but does not need to be, the first memory address to be accessed in accordance with the ordering indication), the addressing mode may identify an adjustment direction used at least during determination of each other memory address, and the ordering indication may be determined in dependence on the adjustment direction.

In some implementations the addressing mode will identify not just an adjustment direction, but may also provide information enabling determination of an adjustment amount. The adjustment direction and adjustment amount information can then be used to determine each memory address in the sequence. For example, based on such addressing mode information, it may be possible to construct a sequence of increasing or decreasing memory addresses, each separated from each other by the adjustment amount. In some implementations, the adjustment direction and adjustment amount may also be used when determining the one memory address that is determined from the memory address indication, for example when the addressing mode identifies a pre-decrementing mechanism that causes the memory address to be determined by decrementing by the adjustment amount a memory address determined from the memory address indication.

Whilst in some implementations it may be the case that the order in which the memory addresses are to be accessed so as to meet the observability constraints could differ from the way in which the sequence of addresses are determined based on the addressing mode, it has been found that it is often the case that there is inherent link between the ordering of the accesses required to meet the observability constraints and the adjustment direction provided by the addressing mode, and hence it is often the case that the addressing mode information can be re-used to determine the ordering indication, either by itself, or in combination with other information provided by the instruction.

As another example of information provided by the ordering constrained access instruction that can also be used when determining the ordering indication, in one example implementation the ordering indication may be derived in dependence on an instruction type of the ordering constrained access instruction. In one particular example implementation, this instruction type information may be used in combination with the earlier-mentioned addressing mode information.

In one example implementation, the instruction type is arranged to identify whether the ordering constrained access instruction is a load instruction seeking to load the multiple data values from memory into a plurality of the registers, or a store instruction seeking to store the multiple data values from the plurality of registers to memory.

In one example implementation the ordering indication is derived from information encoded into the ordering constrained access instruction identifying whether the ordering constrained access instruction is to be used to perform a stack-type access operation or is to be used to perform a non-stack-type access operation. This may be explicitly identified within the instruction, for example by identifying that the ordering constrained access instruction is using a stack pointer to identify the required memory addresses, or alternatively the fact that the ordering constrained access instruction is being used to perform a stack-type access operation may be inferred from other information within the instruction, for instance where a particular addressing mode is reserved for use when performing stack-type access operations. For example, in one particular implementation a pre-decrementing addressing mode may be reserved for use in performing stack-type store operations, and hence the ordering indication may be determined based on whether the ordering constrained access instruction is performing a store operation and whether that store operation is a stack-type operation. If that is the case, then one form of ordering indication may be determined, whereas if that is not the case then an opposite ordering indication may be determined.

Whilst the above described techniques can be used to allow the ordering constrained access instruction to be used to access any number of multiple data values, in one particular example implementation the ordering constrained access instruction is arranged to access a pair of data values, and provides register indication information sufficient to identify a register associated with each data value in the pair of data values. In particular, it has been found that there are many instances where it is desirable to store the contents of two registers to (typically consecutive) addresses in memory, or to load data from (typically consecutive) addresses in memory to a pair of registers, and the provision of the ordering constrained access instruction defined herein enables this to be achieved by executing a single instruction rather than having to execute two instances of the earlier-mentioned single access ordering constrained access instruction.

In instances where the ordering constrained access instruction is to be used to access a pair of data values, the memory address information may be arranged to provide a memory address indication used to determine one memory address to be associated with one of the data values in the pair of data values, and then a further memory address to be associated with the other of the data values in the pair may be derived from the one memory address. For instance, the further memory address may be inferred once the one memory address has been determined, based on the addressing mode information.

The ordering constrained access instruction used to access multiple data values can take a variety of forms. In one example implementation, the ordering constrained access instruction is a store release instruction used to store multiple data values to memory, and the instruction decoder circuitry is arranged, on decoding the store release instruction, to control the processing circuitry to ensure:

that any access instruction that is observed as having completed execution before the store release instruction is observed as being executed will be an access instruction appearing in a program order prior to the store release instruction; and that a given store operation in a sequence of store operations used to store the multiple data values to memory during execution of the store release instruction is observable as having completed before performance of any subsequent store operation following the given store operation in the sequence of store operations is observable.

Hence, the requirements of store release behaviour are met both in respect of other access instructions appearing in the program and in respect of the individual store operations performed in order to execute the store release instruction.

As another example, the ordering constrained access instruction may be a load acquire instruction used to load multiple data values into associated registers in the set of registers, and the instruction decoder circuitry may be arranged, on decoding the load acquire instruction, to control the processing circuitry to ensure:

that a given load operation in a sequence of load operations used to load the multiple data values into the associated registers during execution of the load acquire instruction is observable as having completed before performance of any subsequent load operation following the given load operation in the sequence of load operations is observable; and that any access instruction appearing in a program order after the load acquire instruction will only be observed as being executed after execution of the load acquire instruction has been completed.

Hence, the requirements of load acquire behaviour are met both in respect of other access instructions appearing in the program and in respect of the individual load operations performed in order to execute the load acquire instruction.

There are various ways in which the instruction decoder circuitry may handle the ordering constrained access instruction in order to appropriately control the processing circuitry to perform the specified access operations whilst meeting the required observability conditions. In one particular example implementation the instruction decoder circuitry is arranged to decompose the ordering constrained access instruction used to access multiple data values into a sequence of single access ordering constrained access instructions, where each single access ordering constrained access instruction is arranged to access one of the data values amongst the multiple data values. In accordance with such an approach, the instruction decoder circuitry is arranged to determine the order in which to control the processing circuitry to execute each single access ordering constrained access instruction in the sequence dependent on the ordering indication. Hence, it may decompose the ordering constrained access instruction into a series of single access ordering constrained access instructions, and then either cause the processing circuitry to execute that series in a default order or in a reverse order, depending on the ordering indication determined from the ordering constrained access instruction.

Particular example implementations will now be discussed with reference to the figures.

FIG. 1 is a block diagram of a system incorporating an apparatus in accordance with one example implementation. The apparatus may take the form of either the processor core 10 or the processor core 20 in the example of FIG. 1, and as will be apparent from FIG. 1 both of these processor cores may be constructed in an identical manner. For the purposes of the following discussion it will be assumed that processor core 10 is executing a sequence of instructions that includes one or more instances of the earlier-discussed ordering constrained access instruction used to access multiple data values, and the processor core 20 is an observing entity for those accesses. However, it will be appreciated that it could also be the case that the processor core 20 is executing such instructions, and the processor core 10 is an observer, and indeed both situations could occur within the same system. Further, whilst only two processor cores 10, 20 are shown for simplicity, it will be appreciated that a number of additional processing elements may also be provided within the system, that may operate to execute such instructions, and/or be observers of accesses made by other processing elements.

The processor cores 10, 20 are coupled to an interconnect 30 via which they share access to memory 45. The interconnect can take a variety of forms, but in the example shown is a coherent interconnect that may include a system cache 35 accessible to both of the processor cores 10, 20, and associated cache coherency circuitry 40 to ensure that each of the processor cores has a coherent view of the data stored within the caches of the system. As shown in FIG. 1, in addition to the system cache 35, there may be one or more other levels of cache, for example one or more levels of local cache 15, 25 accessible to the respective processor cores 10, 20. As will be understood by those of ordinary skill in the art, the cache coherency circuitry 40 can employ any of a number of known cache coherency schemes to ensure that each processor core 10, 20 will access the most up-to-date version of the data cached within the system in response to issuing a request to access that data.

As shown in FIG. 1, the processor core 10 may include an instruction decoder 50 for decoding instructions fetched from memory or one of the caches, in order to generate control signals that are then used to control the processing circuitry 52 to perform the operations required by those instructions. During performance of such operations, the processing circuitry 52 has access to a set of registers 54 in which data values to be used as inputs to the operations may be stored, and in which the output results generated by those operations may be stored.

Some of the instructions executed by the processor core 10 may cause access operations to be performed by the processing circuitry 52 in order to load data values from the memory/caches into the registers 54 (in this instance the access operations being load operations), and/or to store data values from the registers 54 to the memory/caches (in this instance the access operations being store operations). When store operations are to be performed, they may be temporarily buffered within the store buffer 56, and the processor core 10 may be able to perform some reordering of the store operations held within the store buffer in order to seek to improve performance. As also shown in FIG. 1, in some instances a load buffer 58 may be provided to temporarily buffer load operations to be performed by the processor core. In an out of order processor, it may be possible to reorder certain load operations in situations where the address computation time may vary amongst different load instructions, and in such cases the presence of a load buffer 58 can be useful.

In the example of FIG. 1, it is assumed that the processor core 20 is constructed in an identical manner to the processor core 10, and hence includes an instruction decoder 60, processing circuitry 62, a set of registers 64, a store buffer 66 and optionally a load buffer 68.

In addition to the earlier-mentioned cache coherency mechanisms used to ensure that each of the processors has a coherent view of the data that may be cached within the system, the system will also typically employ a memory consistency model in respect of memory in order to ensure that the results of reading, writing or updating memory will be predictable. Some systems may employ a relatively weak consistency model to allow flexibility in the way in which accesses to memory may be reordered by particular processing elements within the system, but in some instances it may be desired to emulate the behaviour of a stronger consistency model than is inherently supported by the system. As mentioned earlier, one way to seek to achieve this is through the use of load acquire and store release instructions instead of standard load and store instructions, and in particular when a processing element executes a load acquire instruction or a store release instruction certain observability constraints are ensured so that another processing element in the system observing the accesses performed by a given processing element will observe those accesses as having occurred in a particular program order even if some local reordering is performed by the given processing element.

In accordance with the techniques described herein, in order to improve code density, new forms of load acquire and store release instructions (referred to herein as ordering constrained access instructions that are used to access multiple data values) are provided that are able to specify multiple data values to be accessed, and in particular which, when executed, will cause a series of access operations to be performed in respect of multiple registers, each access operation causing a data value from amongst the multiple data values to be moved between an associated register and an associated memory address (from the register to memory in the event of a store release instruction, and from the memory to a register in the event of a load acquire instruction). In accordance with the techniques described herein, an ordering indication is derived from the ordering constrained access instruction and is used to determine an order in which the multiple data values are to be accessed when performing the series of access operations. By the use of such an ordering indication, it is possible to ensure that the individual accesses are externally observable in the required order, and in particular can meet the same observability requirements that would be met had multiple single access ordering constrained access instructions (i.e. a series of traditional load acquire or store release instructions, each accessing one data value) been executed instead of the new ordering constrained access instruction used to access multiple data values.

Figures 2A, 2B:
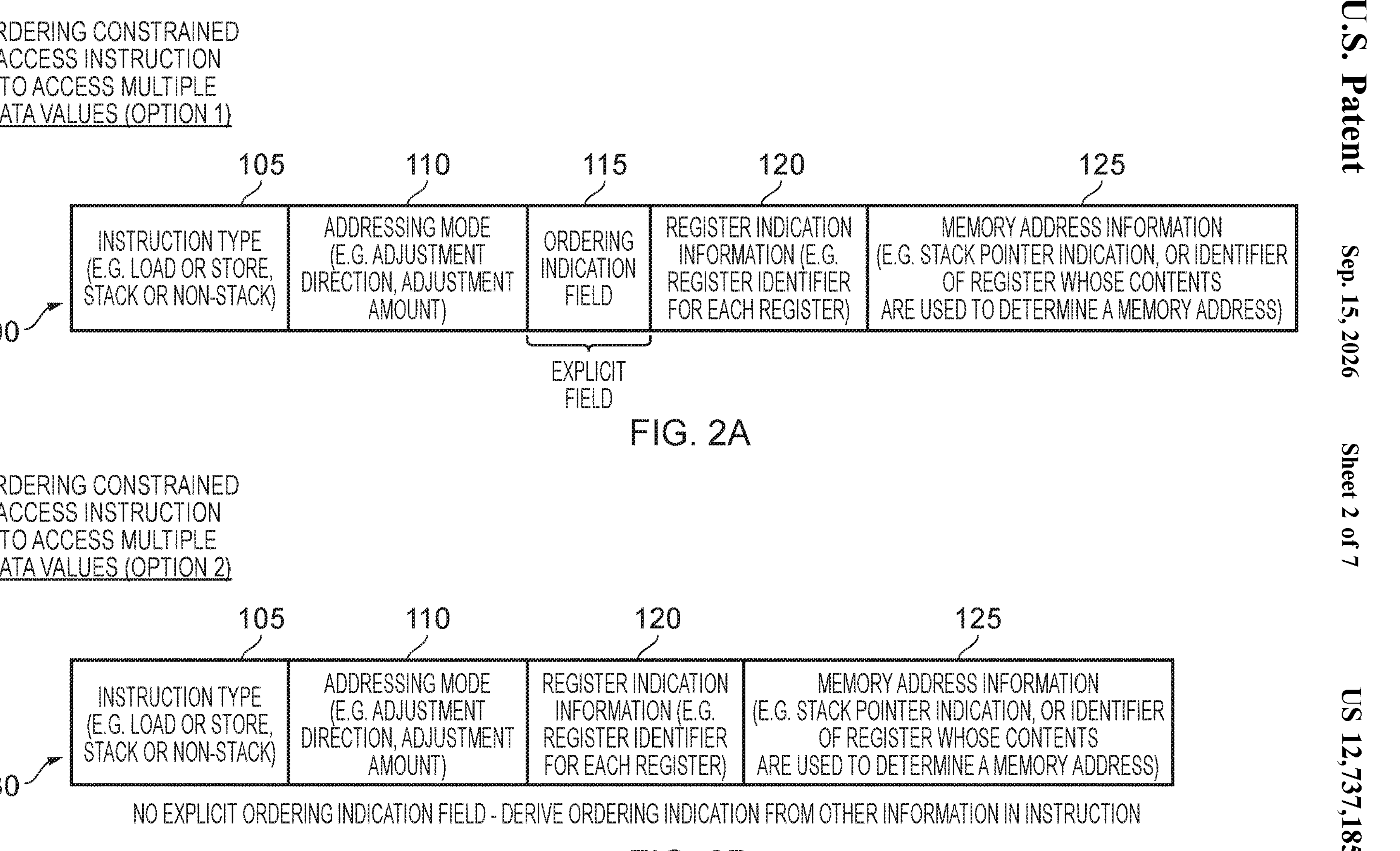
FIGS. 2A and 2B are diagrams schematically illustrating fields provided within an ordering constrained access instruction used to access multiple data values, in accordance with one example implementation.

FIG. 2A is a diagram schematically illustrating fields that may be provided within an ordering constrained access instruction 100 of the type used to access multiple data values, in accordance with one example implementation. A first field 105 is used to specify the instruction type, and hence for example may identify whether the instruction is a load or store instruction. It may also optionally specify additional information, such as whether the instruction is operating on a stack in memory or instead is operating on a non-stack region of memory.

A further field 110 provides an addressing mode, and is used in combination with the memory address information in the memory address field 125 to determine the memory addresses associated with each of the data values to be accessed. The memory address information in the field 125 may for instance give sufficient information to enable one of the addresses to be determined, for example by providing a stack pointer indication used to identify a stack pointer, or by identifying a register whose contents may be used to determine the memory address. In this latter case, it may for example be the case that the data value in that identified register is used as an offset to add to some base address in order to determine the memory address.

The addressing mode information can then be used to compute each of the other addresses required, and indeed in some instances can also be taken into account when computing the first memory address from the memory address information in the field 125. The addressing mode may for example indicate an adjustment direction, such as whether each subsequent address is to be determined by incrementing the previously determined address, or by decrementing the previously determined address. The addressing mode may also provide an adjustment amount in some implementations, so as to allow configurability as to the amount of the adjustment to be made when computing each subsequent address.

A register indication field 120 is also provided to store register indication information. This information can be used to determine a register identifier for each register to be accessed when executing the ordering constrained access instruction. In one example implementation, each register may be explicitly identified within the register indication field 120. However, in an alternative implementation, one register may be identified, and each additional register may be inferred, for example in situations where the instruction operates in respect of a series of adjacent registers, or registers separated by a predetermined amount.

As also shown in FIG. 2A, in accordance with this first example implementation an ordering indication field 115 is provided as an explicit field, in which ordering indication information may be stored to identify the order in which each of the access operations required to execute the ordering constrained access instruction are to be performed. This provides a great deal of flexibility, as it enables the ordering constrained access instruction used to access multiple data values to be used instead of, or to replace, a sequence of standard ordering constrained access instructions that each operate on a single data value (i.e. that move data between one register and an address in memory in either direction) whilst ensuring that the observability requirements between the individual access operations are met.

Whilst in the example of FIG. 2A, an explicit ordering indication field is used, in an alternative example implementation, as illustrated in FIG. 2B, there may be no need for an explicit ordering indication field, and instead it may be possible to derive the ordering indication from other information provided within the instruction. In particular, in the example of FIG. 2B the ordering constrained access instruction 130 that is used to access multiple data values includes the earlier described fields 105, 110, 120, 125, but no explicit ordering indication field 115. Instead, it is possible in this alternative implementation to infer the ordering indication from other information in the instruction, and in particular in one example implementation this is achieved with reference to both the instruction type information in the field 105 and the addressing mode information in the field 110.

Figure 3:
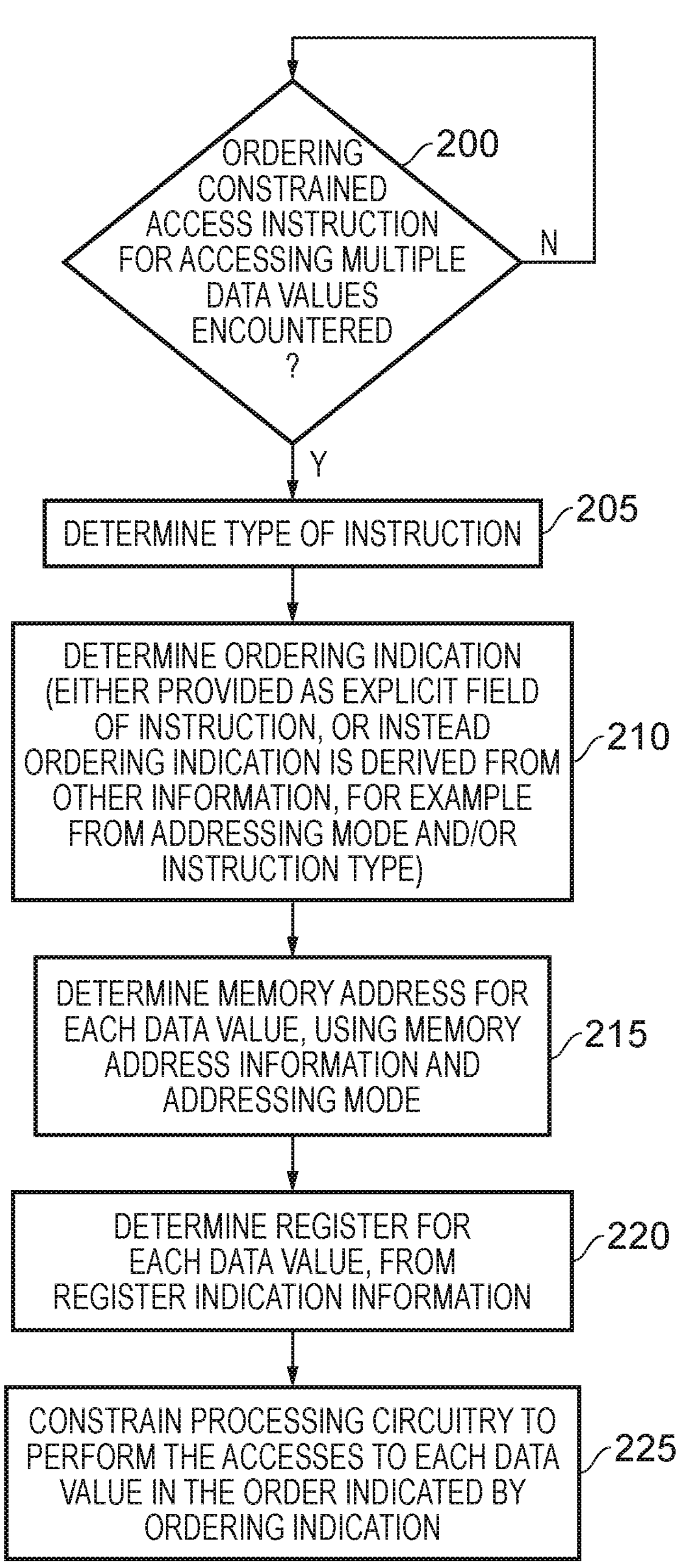
FIG. 3 is a flow diagram illustrating how an ordering constrained access instruction used to access multiple data values is processed in accordance with one example implementation.

FIG. 3 is a flow diagram illustrating how the ordering constrained access instruction may be processed in accordance with one example implementation. At step 200, when it is determined that an ordering constrained access instruction for accessing multiple data values has been encountered, then at step 205 it is determined what type of instruction is being executed, for example whether the instruction is a load acquire instruction or a store release instruction.

At step 210, the ordering indication is determined, and as discussed earlier this may either be determined with reference to an explicit field within the instruction, or instead may be derived from other information, for example from an indication of the addressing mode and/or the instruction type.

At step 215, the memory address for each data value is determined, using the memory address information in the field 125 and the addressing mode information in the addressing mode field 110. In addition, at step 220, the register associated with each data value is determined, using the information in the register indication field 120.

Once all of the above information has been determined, then at step 225 the processing circuitry can be constrained to perform the accesses to each data value in the order indicated by the ordering indication. By such an approach, it is possible to meet the observability requirements not only in respect of other access instructions being executed by the processor core (as required by the known load acquire and store release instructions) but also in respect of the individual access operations required to implement the ordering constrained access instruction.

For example, when the ordering constrained access instruction being executed is a store release instruction used to store multiple data values to memory, the instruction decoder 50 may be arranged, on decoding the store release instruction, to control the processing circuitry 52 to ensure:

that any access instruction that is observed as having completed execution before the store release instruction is observed as being executed will be an access instruction appearing in a program order prior to the store release instruction; and that a given store operation in the sequence of store operations used to store the multiple data values to memory during execution of the store release instruction is observable as having completed before performance of any subsequent store operation following the given store operation in the sequence of store operations is observable.

Similarly, when the ordering constrained access instruction is a load acquire instruction used to load multiple data values into associated registers in the set of registers, the instruction decoder 50 may be arranged, on decoding the load acquire instruction, to control the processing circuitry 52 to ensure:

that a given load operation in a sequence of load operations used to load the multiple data values into the associated registers during execution of the load acquire instruction is observable as having completed before performance of any subsequent load operation following the given load operation in the sequence of load operations is observable; and that any access instruction appearing in a program order after the load acquire instruction will only be observed as being executed after execution of the load acquire instruction has been completed.

Whilst in FIG. 3 steps 205, 210, 215 and 220 are shown sequentially, it will be appreciated that one or more of these steps may be performed in parallel, dependent on the implementation. In addition, which steps are performed by the decoder and which steps are performed by the processing circuitry may also vary dependent on implementation. In one particular example implementation, the decoder may be arranged to determine which register operands are to be used, and the addressing mode. The processing circuitry can then be arranged to implement the addressing mode in order to perform the required access operations whilst enforcing the required ordering as determined from the ordering indication.

FIGS. 4A and 4B are diagrams illustrating how the observability requirements are met between the individual access operations required to execute the above-described ordering constrained access instruction. In both cases, it is assumed that the ordering constrained access instruction causes a pair of data values to be accessed, with those data values either being moved from memory into a pair of registers in the event of a load acquire instruction, or with those data values being moved from a pair of registers to memory in the event of a store release instruction. The two access operations required to access each data value in the pair of data values are referred to in FIGS. 4A and 4B as access operations 1 and 2.

As shown in FIG. 4A, when each access operation can be performed atomically, then the processing circuitry is constrained to handle the two access operations such that, if any observing entity within the system can observe any part of the result of access operation 2, it is guaranteed that that observing entity will also be able to observe all parts of the result of access operation 1. Put another way, this also means that if the observer cannot observe the entirety of access operation 1, then it will not be able to observe any part of the access operation 2.

FIG. 4B illustrates a scenario where access operation 1 needs to be broken down into multiple separate accesses, in particular in this example a first access and a second access. There are various reasons why this may occur, but in the example of FIG. 4B it is assumed that the required data values to be accessed are spread across two cache lines, and hence separate accesses to each of those cache lines is required. This means that the performance of access operation 1 is not itself atomic. Nevertheless, even in that scenario, the processing circuitry is constrained to ensure that the above observability constraint between access operation 1 and access operation 2 is met.

Figure 5:
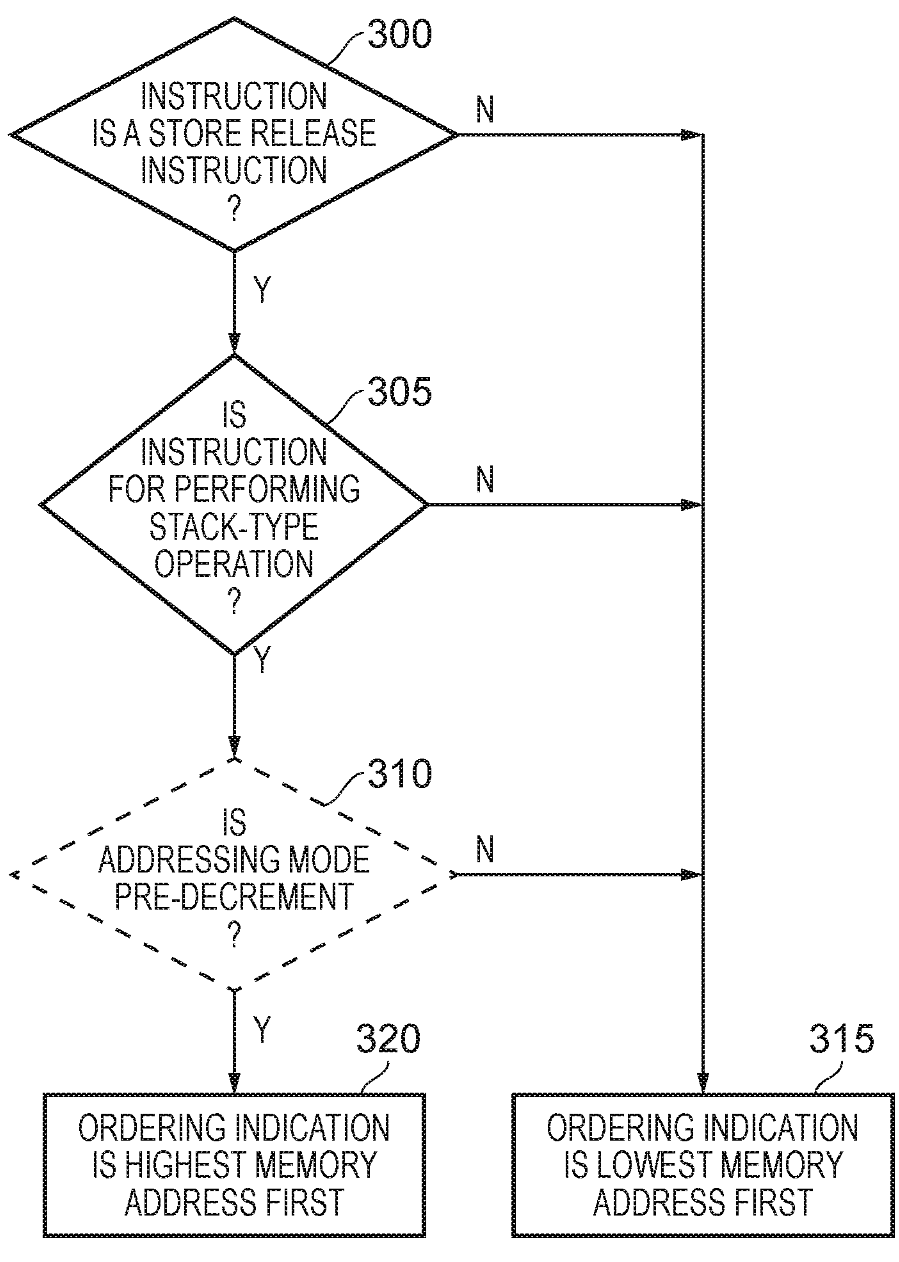
FIG. 5 is a flow diagram illustrating how an ordering indication is derived in accordance with one example implementation.

FIG. 5 is a flow diagram illustrating a particular example implementation used to determine the ordering indication from other information present within the ordering constrained access instruction. At step 300, it is assumed that an ordering constrained access instruction used to access multiple data values has been encountered, and it is determined whether that instruction is a store release instruction. In this example implementation, if the instruction is not a store release instruction, then the process proceeds directly to step 315 where the ordering indication is determined to identify that the lowest memory address should be accessed first.

However, if at step 300 it is determined that the instruction is a store release instruction, then at step 305 it is determined whether the instruction is performing a stack-type operation. This could be determined in a variety of ways. For example, it may be explicitly identified within the instruction, for instance by identifying that the store release instruction is using a stack pointer to identify the required memory addresses. Alternatively, it may be possible to infer this information from other information provided within the instruction. For example, if a particular addressing mode is reserved for use when performing stack-type store operations, then the presence of that addressing mode may be used at step 305 to determine that the instruction is intended to perform a stack-type operation.

If the instruction is determined not to be used to perform a stack-type operation, then the process again proceeds to step 315, where the ordering indication is determined to identify that the lowest memory address should be accessed first.

If it is determined at step 305 that the instruction is for performing a stack-type operation, then in one example implementation the process may proceed directly to step 320 where the ordering indication is determined to identify that the highest memory address should be accessed first. However, as indicated by the dotted box 310, in implementations where more than one addressing mode may be used to perform stack-type operations, then it may first be determined at step 310 whether the addressing mode is a pre-decrement addressing mode. If not, the process may proceed to step 315 where the ordering indication is determined to identify that the lowest memory address is to be accessed first, but if the addressing mode is pre-decrement, then the process proceeds to step 320 where the ordering indication is determined to identify that the highest memory address should be accessed first.

By using the techniques described herein, it is possible to significantly reduce code density, by allowing a single instruction to be used were previously multiple separate instructions would be required. For example, considering existing store release instructions, then previously multiple store release instructions may have been required such as the following pair of instructions:

STLR X1 [SP, −8]!

STLR X0 [SP, −8]!

Execution of the first store release instruction would cause the data in register X1 to be stored to a location in a stack in memory determined by pre-decrementing the provided stack pointer value by eight bytes to generate a new stack pointer value. Execution of the second store release instruction would then cause the data in register X0 to be stored to a location in a stack in memory determined by pre-decrementing the stack pointer value generated through execution of the first STLR instruction, again by eight bytes, to create an updated stack pointer value.

In accordance with the techniques described herein, these two store release instructions could be replaced by a single new instruction of the form:

STLP X0, X1, [SP, −16]!

In particular, the "P" indicates that the store release instruction is to be executed on a pair of registers, namely the identified registers X0 and X1, and the ordering indication derived from the instruction identifies that the highest memory address should be accessed first (in one embodiment this can be determined from a combination of the instruction being a store release instruction, and the pre-decrement addressing mode being used). In this case, the pre-decrement amount is 16 bytes, and so the stack pointer is pre-decremented by 16 bytes, so as to enable the first eight bytes of data from register X0 to be stored to the stack followed by the second eight bytes of data from register X1. However, to meet the required observability ordering, the stores will be processed such that the store of X1 is ordered before the store of X0. Two separate store operations can be performed to implement the execution of this instruction, and the processing circuitry will be constrained to ensure that the earlier-mentioned observability requirements between the individual store operations are met.

Whilst the above is an example of a situation where the ordering indication would indicate highest memory address first, the following example is a situation where the new form of store release instruction could be arranged to specify an ordering indication indicating that the lowest memory address should be accessed first. In particular, the following two standard store release instructions:

STLR X0, [X2]

STLR X1, [X2, 8]

could be replaced by the single new store release instruction of the form:

STLP X0, X1, [X2]

In this instance the addressing mode may identify post increment changes to the address by 8 bytes, with a first store access operation being used to store the data in register X0 to a memory address determined from the contents of the register X2, and a second store access operation being used to store the data in register X1 to a memory address determined by incrementing the address determined for the first access operation by 8 bytes. As with the earlier example, the ordering indication could in one embodiment be derived from the addressing mode, and may indicate that the accesses should be performed to the lowest memory address first. As with the earlier example, when executing this new form of store release instruction, the processing circuitry will be constrained to ensure that the earlier-mentioned observability requirements between the individual store operations are met.

There are a number of ways in which the instruction decoder 50 may handle an ordering constrained access instruction of the above type in order to appropriately control the processing circuitry to perform the specified access operations whilst meeting the required observability conditions. In one particular example implementation, as shown in FIG. 6, the decoder may be arranged at step 400 to decompose the ordering constrained access instruction that is used to access multiple data values into a sequence of single access ordering constrained access instructions, each of which is used to access one of the data values. Hence, in such an implementation, the new form of load acquire or store release instructions that are used to access multiple data values can be broken down into a series of existing load acquire or store release instructions, each of which performs an access in respect of the data value associated with a single register.

Then, at step 405, the ordering indication can be determined using any of the techniques discussed earlier. Based on the determined ordering indication, then at step 410 the decoder can determine the order in which to control the processing circuitry to execute each of the single access ordering constrained access instructions. Hence, in one example implementation, the series may be executed in the originally determined decomposed order, for example if the ordering indication indicates that the lowest memory address should be accessed first, but if instead the ordering indication indicates that the highest memory address should be accessed first, the decoder may reverse the order in which the single access ordering constrained access instructions are executed. This provides a particularly simple and efficient mechanism for implementing the handling of these new load acquire and store release instructions.

Figure 7:
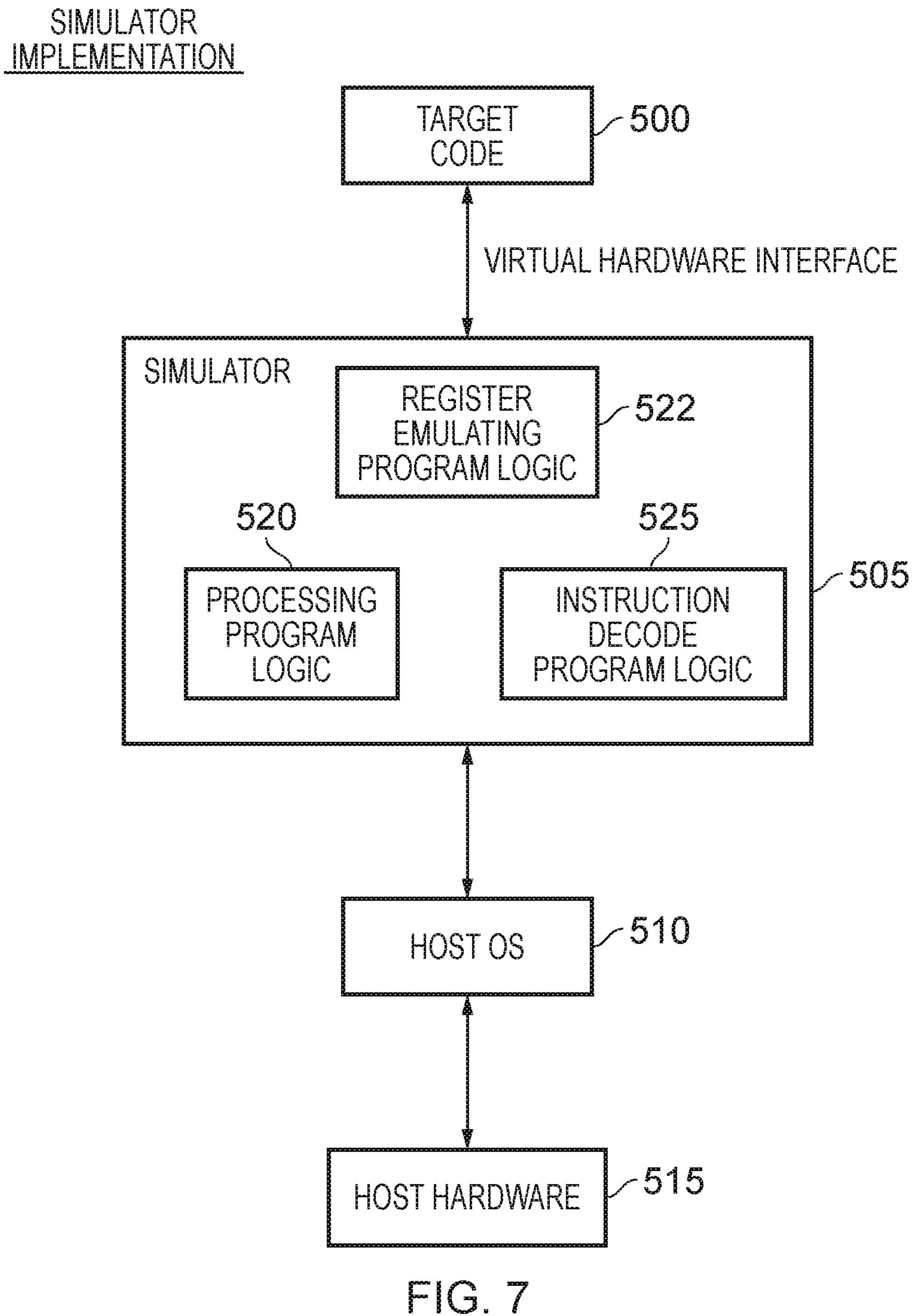
FIG. 7 illustrates an example simulator implementation that may be used.

FIG. 7 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory in the hardware apparatus could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus discussed above can emulate those features. The simulator program may include processing program logic 520 to emulate the behaviour of the processing circuitry 52, 62, instruction decode program logic 525 to emulate the behaviour of the instruction decoder 50, 60, and register emulating program logic 522 to maintain data structures to emulate the set of registers 54, 64. Hence, the techniques described herein for handling ordering constrained access operations can in the example of FIG. 7 be performed in software by the simulator program 505.

It will be appreciated from the above description the techniques described herein provide a particularly efficient mechanism for handling ordering constrained access operations such as load acquire and store release operations, enabling code density and hence performance to be improved by enabling an individual load acquire or store release instruction to be specified that causes data values associated with multiple registers to be accessed, whilst ensuring that the required observability behaviour between the individual access operations required to implement the load acquire or store release instruction is met.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry to perform operations;

instruction decoder circuitry to decode instructions to control the processing circuitry to perform the operations specified by the instructions; and a set of registers to hold data values for access by the processing circuitry;

wherein the instruction decoder circuitry is responsive to an ordering constrained access instruction used to access multiple data values, and providing register indication information and memory address information, to control the processing circuitry to perform a sequence of access operations, where each access operation causes a data value from amongst the multiple data values to be moved between an associated register determined from the register indication information and an associated memory address determined from the memory address information; wherein an ordering indication is derived from the ordering constrained access instruction and used to determine an order in which the multiple data values are to be accessed when performing the sequence of access operations; and the ordering indication is used to identify an order in which the memory addresses associated with the multiple data values are to be accessed, to thereby determine the order in which the multiple data values are to be accessed.

2. The apparatus as claimed in claim 1, wherein the instruction decoder circuitry is arranged to control the processing circuitry to ensure that, for observing circuitry coupled to the apparatus and able to observe the access operations performed by the processing circuitry, a given access operation in the sequence of access operations is observable by the observing circuitry as having completed before performance of any subsequent access operation following the given access operation in the sequence of access operations is observable by the observing circuitry.

3. The apparatus as claimed in claim 2, wherein:

each data value comprises a plurality of data elements;

when performance of the given access operation requires multiple accesses to be performed to access the plurality of data elements of the associated data value, the processing circuitry is arranged to ensure that all of the multiple accesses forming the given access operation are observable by the observing circuitry as having completed before performance of any subsequent access operation following the given access operation in the sequence of access operations is observable by the observing circuitry.

4. The apparatus as claimed in claim 1, wherein the ordering indication is derived from other information encoded into the ordering constrained access instruction.

5. The apparatus as claimed in claim 4, wherein the ordering constrained access instruction specifies an addressing mode used to determine the memory addresses for the multiple data values from the memory address information, and the ordering indication is derived in dependence on the addressing mode.

6. The apparatus as claimed in claim 5, wherein the memory address information is arranged to provide a memory address indication used to determine one memory address, the addressing mode identifies an adjustment direction used at least during determination of each other memory address, and the ordering indication is determined in dependence on the adjustment direction.

7. The apparatus as claimed in claim 4, wherein the ordering indication is derived in dependence on an instruction type of the ordering constrained access instruction.

8. The apparatus as claimed in claim 7, wherein the instruction type is arranged to identify whether the ordering constrained access instruction is a load instruction seeking to load the multiple data values from memory into a plurality of the registers, or a store instruction seeking to store the multiple data values from the plurality of registers to memory.

9. The apparatus as claimed in claim 4, wherein the ordering indication is derived from information encoded into the ordering constrained access instruction identifying whether the ordering constrained access instruction is to be used to perform a stack-type access operation or is to be used to perform a non-stack-type access operation.

10. The apparatus as claimed in claim 1 wherein the ordering constrained access instruction is arranged to access a pair of data values, and provides register indication information sufficient to identify a register associated with each data value in the pair of data values.

11. The apparatus as claimed in claim 10, wherein the memory address information is arranged to provide a memory address indication used to determine one memory address to be associated with one of the data values in the pair of data values, and a further memory address to be associated with the other of the data values in the pair is derived from the one memory address.

12. The apparatus as claimed in claim 1, wherein the ordering constrained access instruction is a store release instruction used to store multiple data values to memory, and the instruction decoder circuitry is arranged, on decoding the store release instruction, to control the processing circuitry to ensure:

that any access instruction that is observed as having completed execution before the store release instruction is observed as being executed will be an access instruction appearing in a program order prior to the store release instruction; and that a given store operation in a sequence of store operations used to store the multiple data values to memory during execution of the store release instruction is observable as having completed before performance of any subsequent store operation following the given store operation in the sequence of store operations is observable.

13. The apparatus as claimed in claim 1, wherein the ordering constrained access instruction is a load acquire instruction used to load multiple data values into associated registers in the set of registers, and the instruction decoder circuitry is arranged, on decoding the load acquire instruction, to control the processing circuitry to ensure:

that a given load operation in a sequence of load operations used to load the multiple data values into the associated registers during execution of the load acquire instruction is observable as having completed before performance of any subsequent load operation following the given load operation in the sequence of load operations is observable; and that any access instruction appearing in a program order after the load acquire instruction will only be observed as being executed after execution of the load acquire instruction has been completed.

14. The apparatus as claimed in claim 1, wherein:

the instruction decoder circuitry is arranged to decompose the ordering constrained access instruction used to access multiple data values into a sequence of single access ordering constrained access instructions, where each single access ordering constrained access instruction is arranged to access one of the data values amongst the multiple data values; and the instruction decoder circuitry is arranged to determine the order in which to control the processing circuitry to execute each single access ordering constrained access instruction in the sequence dependent on the ordering indication.

15. A method of handling ordering constrained access operations in an apparatus having processing circuitry to perform operations, the method comprising:

employing instruction decoder circuitry to decode instructions to control the processing circuitry to perform the operations specified by the instructions;

employing a set of registers to hold data values for access by the processing circuitry;

causing the instruction decoder circuitry, in response to an ordering constrained access instruction used to access multiple data values, and providing register indication information and memory address information, to control the processing circuitry to perform a sequence of access operations, where each access operation causes a data value from amongst the multiple data values to be moved between an associated register determined from the register indication information and an associated memory address determined from the memory address information; and determining, responsive to an ordering indication derived from the ordering constrained access instruction, an order in which the multiple data values are to be accessed when performing the sequence of access operations;

wherein the ordering indication is used to identify an order in which the memory addresses associated with the multiple data values are to be accessed, to thereby determine the order in which the multiple data values are to be accessed.

16. A computer program product comprising a non-transitory computer-readable storage medium storing a computer program for controlling a host data processing apparatus to provide an instruction execution environment, comprising:

processing program logic to perform operations;

instruction decode program logic to decode instructions to control the processing program logic to perform the operations specified by the instructions; and register emulating program logic to emulate a set of registers to hold data values for access by the processing program logic;

wherein the instruction decode program logic is responsive to an ordering constrained access instruction used to access multiple data values, and providing register indication information and memory address information, to control the processing program logic to perform a sequence of access operations, where each access operation causes a data value from amongst the multiple data values to be moved between an associated register determined from the register indication information and an associated memory address determined from the memory address information; wherein:

an ordering indication is derived from the ordering constrained access instruction and used to determine an order in which the multiple data values are to be accessed when performing the sequence of access operations; and the ordering indication is used to identify an order in which the memory addresses associated with the multiple data values are to be accessed, to thereby determine the order in which the multiple data values are to be accessed.

* * * * *